(12) United States Patent
Park et al.

(10) Patent No.: US 8,755,464 B2
(45) Date of Patent: Jun. 17, 2014

(54) METHOD AND APPARATUS FOR PERFORMING CHANNEL ESTIMATION IN A WIRELESS COMMUNICATION SYSTEM

(75) Inventors: Si-Hyun Park, Hwaseong-si (KR); Hwa-Sun You, Seoul (KR); Hee-Won Kang, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 117 days.

(21) Appl. No.: 13/371,326

(22) Filed: Feb. 10, 2012

(65) Prior Publication Data
US 2012/0207253 A1 Aug. 16, 2012

(30) Foreign Application Priority Data
Feb. 11, 2011 (KR) .................. 10-2011-0012209

(51) Int. Cl.
*H03K 9/00* (2006.01)
(52) U.S. Cl.
USPC .......................................................... 375/316
(58) Field of Classification Search
USPC .......................................................... 375/316
See application file for complete search history.

(56) References Cited

U.S. PATENT DOCUMENTS

| | | | | |
|---|---|---|---|---|
| 8,229,036 B2* | 7/2012 | Kolze | | 375/340 |
| 8,351,526 B2* | 1/2013 | Butussi et al. | | 375/260 |
| 2003/0128656 A1* | 7/2003 | Scarpa | | 370/203 |
| 2005/0141626 A1* | 6/2005 | Lee et al. | | 375/260 |
| 2007/0066242 A1* | 3/2007 | Yi et al. | | 455/69 |
| 2007/0268976 A1* | 11/2007 | Brink et al. | | 375/260 |
| 2007/0287487 A1* | 12/2007 | Puig-Oses et al. | | 455/501 |
| 2008/0268887 A1* | 10/2008 | Jansen et al. | | 455/503 |
| 2009/0161781 A1* | 6/2009 | Kolze | | 375/260 |
| 2010/0158149 A1* | 6/2010 | Gorokhov | | 375/260 |
| 2010/0302984 A1* | 12/2010 | Rege et al. | | 370/312 |
| 2011/0043340 A1* | 2/2011 | Kim et al. | | 340/310.12 |
| 2011/0051618 A1* | 3/2011 | Li et al. | | 370/252 |
| 2011/0142003 A1* | 6/2011 | Kuchi et al. | | 370/330 |
| 2011/0249773 A1* | 10/2011 | Lee | | 375/316 |
| 2012/0069889 A1* | 3/2012 | Molnar et al. | | 375/227 |
| 2012/0082252 A1* | 4/2012 | Annavajjala et al. | | 375/260 |
| 2012/0147761 A1* | 6/2012 | Zhang et al. | | 370/252 |
| 2012/0201152 A1* | 8/2012 | Yoo et al. | | 370/252 |

OTHER PUBLICATIONS

Won Gi Jeon, et al.: "Two Dimensional MMSE Channel Estimation for OFDM Systems with Transmitter Diversity", School of Electrical and Electronic Engineering, Chung-Ang University, Seoul, Korea, IEEE Vehicular Technology Conference, Fall, 2001, vol. 3, pp. 1682-1685.

* cited by examiner

*Primary Examiner* — Santiago Garcia

(57) ABSTRACT

A method and apparatus for performing channel estimation in a wireless communication system, in which a channel estimate of each pilot tone included in adjacent first and second resource allocation blocks is calculated. Channel estimates of first pilot tones are detected, which have a predetermined subcarrier spacing or less from the second resource allocation block, channel estimates of second pilot tones are detected; and which have a predetermined subcarrier spacing or less from the first resource allocation block. The channel estimates of the first and second pilot tones are updated, and channel estimation is then performed using the updated channel estimates.

20 Claims, 3 Drawing Sheets

METHOD AND APPARATUS FOR PERFORMING CHANNEL ESTIMATION IN A WIRELESS COMMUNICATION SYSTEM

CROSS-REFERENCE TO RELATED APPLICATION(S) AND CLAIM OF PRIORITY

The present application is related to and claims priority under 35 U.S.C. §119(a) to a Korean Patent Application filed in the Korean Intellectual Property Office on Feb. 11, 2011 and assigned Serial No. 10-2011-0012209, the contents of which are incorporated herein by reference.

TECHNICAL FIELD OF THE INVENTION

The present invention is generally related to wireless communication systems, and more particularly, to a method and apparatus for performing channel estimation in a wireless communication system.

BACKGROUND OF THE INVENTION

In a wireless communication system, accurate channel estimation is often needed for accurate signal decoding. One particularly good channel estimation techniques includes a Minimum Mean Square Error (MMSE) channel estimation.

According to the MMSE channel estimation technique, channel estimation is initially performed based on Least Square (LS) and then the correlation matrix of a channel that varies along time and frequency axes is calculated on a channel basis. Since the MMSE channel estimation technique minimizes a total estimation error when taking noise into account, it generally performs well in a multi-path fading channel environment.

MMSE channel estimation is based on pilot tones of Orthogonal Frequency Division Multiple Access (OFDMA) symbols. Therefore, the performance of channel estimation may be degraded when performed with relatively small number of pilot tones. Accordingly, as many pilot tones as possible should be used to increase the performance of MMSE channel estimation.

SUMMARY OF THE INVENTION

To address the above-discussed deficiencies of the prior art, it is a primary object to provide at least the advantages described below. Accordingly, an aspect of embodiments of the present invention is to provide a method and apparatus for performing channel estimation in a wireless communication system.

Another aspect of embodiments of the present invention is to provide a method and apparatus for increasing channel estimation performance by using the most adjacent pilot tones included in adjacent Physical Resource Units (PRUs) to which the same precoding scheme has been applied.

In accordance with an embodiment of the present invention, there is provided a channel estimation method of a receiver in a wireless communication system, in which a channel estimate of each pilot tone included in adjacent first and second resource allocation blocks is calculated. Channel estimates of first pilot tones are detected, which have a predetermined subcarrier spacing or less from the second resource allocation block. Channel estimates of second pilot tones are detected, which have a predetermined subcarrier spacing or less from the first resource allocation block. The channel estimates of the first and second pilot tones are updated, and channel estimation is then performed using the updated channel estimates.

In accordance with another embodiment of the present invention, there is provided a receiver in a wireless communication system, in which a receiver is configured to receive a signal from a transmitter, and a channel estimator that is configured to calculate a channel estimate of each pilot tone included in adjacent first and second resource allocation blocks detect channel estimates of first pilot tones having a predetermined subcarrier spacing or less from the second resource allocation block, detect channel estimates of second pilot tones having a predetermined subcarrier spacing or less from the first resource allocation block, update the channel estimates of the first and second pilot tones, and perform channel estimation using the updated channel estimates.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, the same drawing reference numerals will be understood to refer to the same elements, features and structures.

DETAILED DESCRIPTION OF THE INVENTION

FIGS. 1 through 4, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless networks. Reference will be made to preferred embodiments of the present invention with reference to the attached drawings. A detailed description of a generally known function and structure of the present invention will be avoided lest it should obscure the subject matter of the present invention.

A method and apparatus for performing channel estimation in a wireless communication system is provided according to an embodiment of the present invention. Specifically, the embodiment of the present invention provides a method and apparatus for increasing channel estimation performance by using the most adjacent pilot tones included in adjacent Physical Resource Units (PRUs) to which the same precoding scheme is applied in a wireless communication system. While the following description is given in the context of a wireless communication system conforming to the Institute of Electrical and Electronics Engineers (IEEE) 802.16m protocol, it is to be understood that the method and apparatus of the present invention are also applicable to other types of communication systems.

In the wireless communication system, PRUs are mapped to Contiguous Logical Resource Units (CLRUs) in the frequency domain. The CLRUs are divided into one or more Frequency Partitions (FPs) and allocated as cell-specific or sector-specific resources.

Among total PRUs, four contiguous PRUs form a subband and CLRUs are configured in units of a subband. That is, after subband partitioning for partitioning CLRUs, the basic size of physically contiguous radio resources is one subband.

Figure 1:
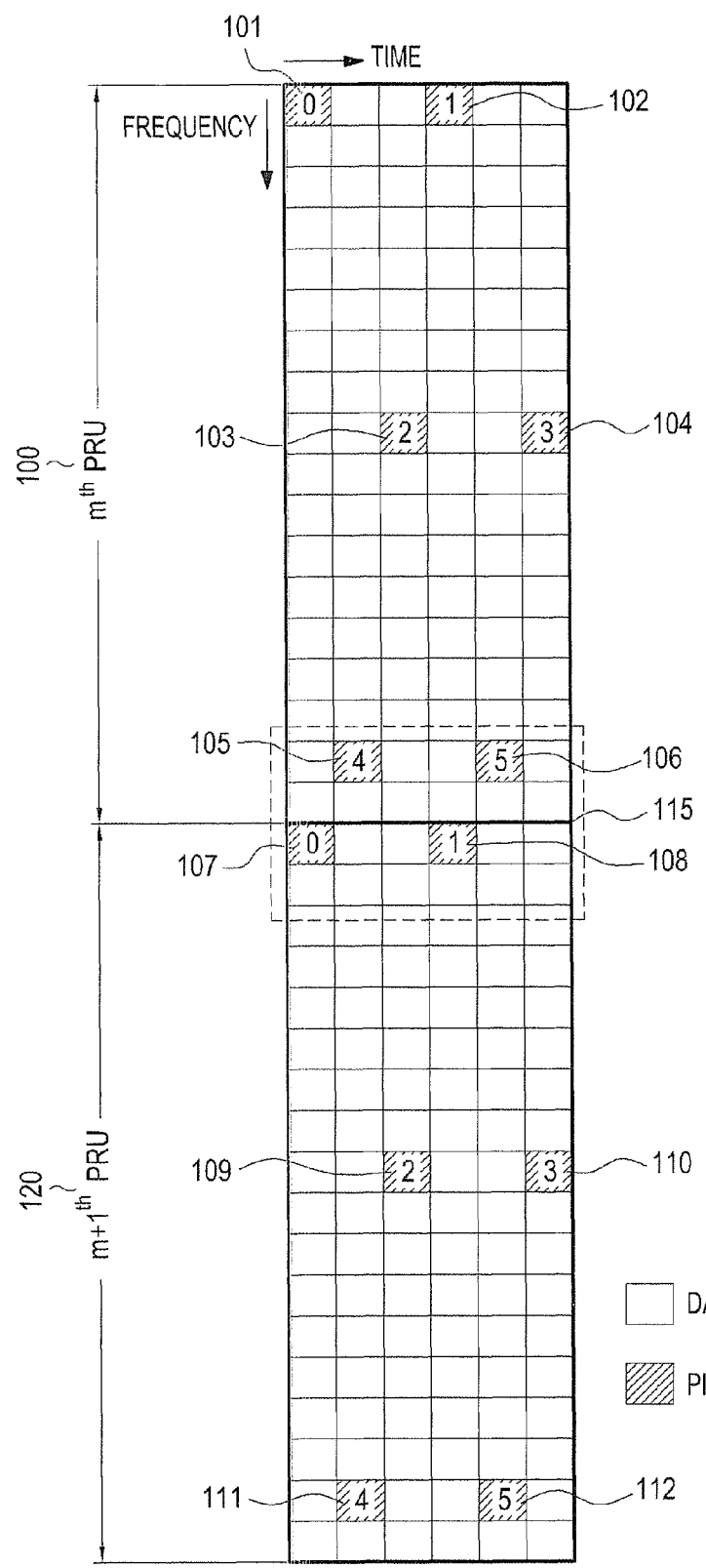
FIG. 1 illustrates example adjacent Physical Resource Units (PRUs) having a same subband according to an embodiment of the present invention.

FIG. 1 illustrates an example structure of adjacent PRUs in the same subband according to an embodiment of the present invention.

Referring to FIG. 1, two adjacent PRUs, that is, an $m^{th}$ PRU 100 and an $(m+1)^{th}$ PRU 102 are included in the same subband and use the same precoding scheme.

Each of the $m^{th}$ PRU 100 and the $(m+1)^{th}$ PRU 102 includes f contiguous subcarriers in the frequency domain and t contiguous Orthogonal Frequency Division Multiple Access (OFDMA) symbols in the time domain. In addition, each of the $m^{th}$ PRU 100 and the $(m+1)^{th}$ PR 120 includes p pilot tones and d data tones. In the illustrated case of FIG. 1, f=18, t=6, p=6, and d=102.

According to one embodiment, channel estimation is performed using pilot tones having a predetermined subcarrier spacing or less from the $(m+1)^{th}$ PRU 120 by a predetermined distance or less, and pilot tones having a predetermined subcarrier spacing or less from the $m^{th}$ PRU 100. For example, the pilot tones used for channel estimation include pilot tones 105 and 106 having a smallest subcarrier spacing from the $(m+1)^{th}$ PRU 120 among the pilot tones 101 to 106 of the $m^{th}$ PRU 100 and pilot tones 107 and 108 having a smallest subcarrier spacing from the subcarriers of the $m^{th}$ PRU 100 among the pilot tones 107 to 112 of the $(m+1)^{th}$ PRU 102. Specifically, the pilot tones 105 to 108 nearest to a frequency partitioning position 115 between the $m^{th}$ PRU 100 and the $(m+1)^{th}$ PRU 120 are used for channel estimation. Hereinbelow, the pilot tones 105 to 108 will be referred to as the most adjacent pilot tones.

If the most adjacent pilot tones 105 to 108 are spaced by two subcarriers and used for channel estimation, they may increase a channel estimation gain. However, the remaining pilot tones may have greater spacing, such as by 10 or more subcarriers. Therefore, it may be difficult to obtain a channel estimation gain with the remaining pilot tones even though additional operations such as time offset compensation and whitening processing are performed. In this context, a method and apparatus for performing channel estimation using the most adjacent pilot tones 105 to 108 are provided according to an embodiment of the present invention.

Figure 2:
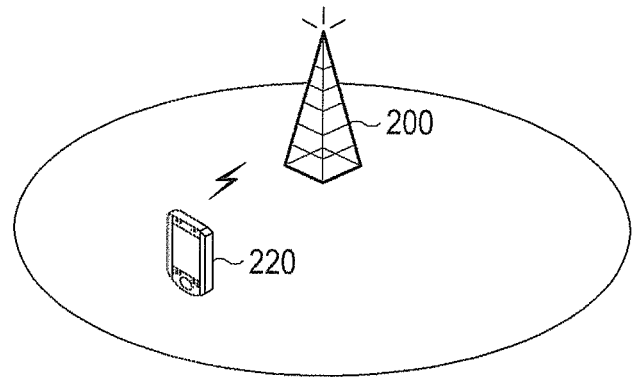
FIG. 2 illustrates an example configuration of a wireless communication system according to an embodiment of the present invention.

With reference to FIG. 2, the configuration of a wireless communication system according to an embodiment of the present invention will be described below.

FIG. 2 illustrates an example configuration of a wireless communication system according to an embodiment of the present invention.

Referring to FIG. 2, the wireless communication system includes a Base Station (BS) 200 and a mobile terminal 220.

The BS 200 transmits a signal including pilot tones and data tones to the mobile terminal 220. The pilot tones preset to a predetermined value are transmitted on a subchannel at a predetermined time.

The mobile terminal 220 is located within the cell coverage of the BS 200 and receives signals from the BS 200. Upon receipt of a signal from the BS 200, the mobile terminal 220 converts the received signal to a frequency signal using a Fast Fourier Transform (FFT). The mobile terminal 220 then generates a logical signal from the frequency signal and determines whether a burst has been allocated to contiguous PRUs in which the same precoding is applied. If the burst has been allocated to contiguous PRUs in which the same precoding is applied, the mobile terminal 220 performs channel estimation using the most adjacent pilot tones in the contiguous PRUs. The channel estimation at the mobile terminal 220 will be described in detail later.

Figure 3:
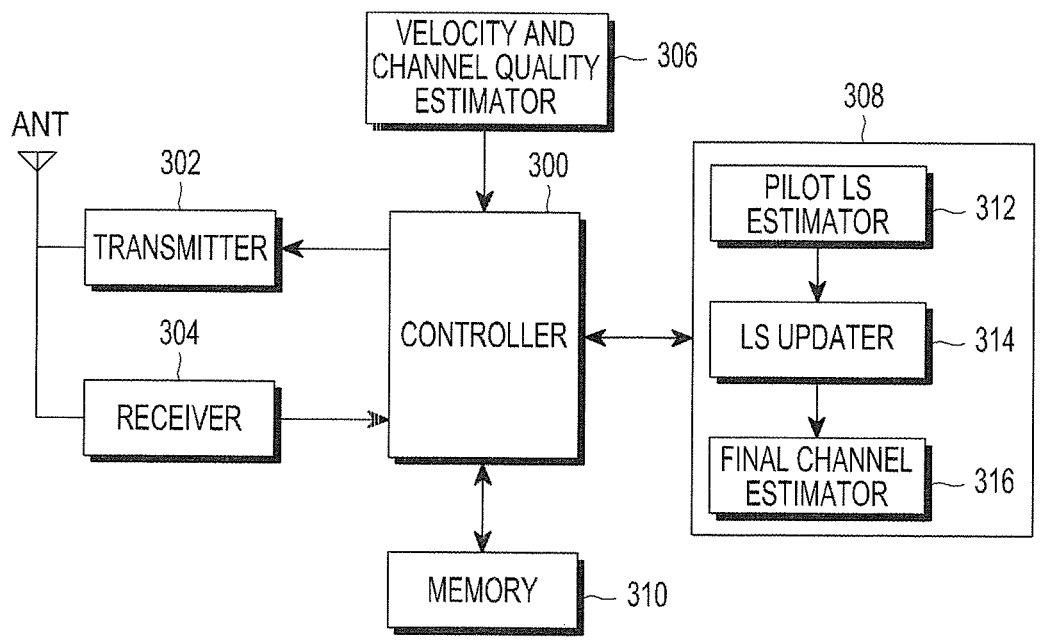
FIG. 3 illustrates an example mobile terminal according to an embodiment of the present invention.

FIG. 3 illustrates an example mobile terminal according to an embodiment of the present invention.

Referring to FIG. 3, the mobile terminal includes a controller 300, a transmitter 302, a receiver 304, a velocity and channel quality estimator 306, a channel estimator 308, and a memory 310.

The controller 300 provides overall control of the mobile terminal. Specifically, the controller 300 controls the transmitter 302, the receiver 304, the velocity and channel quality estimator 306, the channel estimator 308, and the memory 310.

The transmitter 302 and the receiver 304 are used to wirelessly communicate with a BS. The transmitter 302 transmits wireless signals to the BS. The receiver 304 receives wireless signals from the BS, converts the received signals to frequency signals using a FFT, and generates logical signals from the frequency signals.

The velocity and channel quality estimator 306 estimates the velocity of the mobile terminal and the quality of a received channel. For example, the velocity and channel quality estimator 306 generates channel quality information by calculating the Carrier-to-Interference and Noise Ratio (CINR) of received signals. The following description will be given in the context of the channel quality information comprising a CINR by way of example. The estimated velocity and channel quality information is stored in the memory 310 and provided to the channel estimator 308 under the control of the controller 300.

In another embodiment of the present invention, the velocity and channel quality estimator 306 may be separated into different physical components such as a velocity estimator for estimating the velocity of the mobile terminal and a channel quality estimator for estimating the channel quality of a received channel.

The channel estimator 308 includes a pilot Least Square (LS) estimator 312, an LS updater 314, and a final channel estimator 316. Upon receipt of signals from the BS and the estimated velocity and channel quality information, the channel estimator 308 performs the following operations.

The pilot LS estimator 312 estimates the LS of each pilot tone. Specifically, if $N_p$ pilot tones are allocated to each PRU and the $N_p$ pilot tones are arranged at the positions of $\{[l_1^m, k_1^m], \ldots, [l_{N_p}^m, k_{N_p}^m]\}$ in the $m^{th}$ PRU, the pilot LS estimator 312 calculates an LS estimate of a $p^{th}$ pilot tone in the $m^{th}$ PRU according to equation 1:

$$\hat{H}_{LS}[m][p] = \frac{Y[l_p^m, k_p^m]}{\mu X[l_p^m, k_p^m]} \quad (1)$$

where m denotes the index of the PRU, p denotes the index of a pilot tone, $\hat{H}_{LS}[m][p]$ denotes the LS estimate of the $p^{th}$ pilot tone in the $m^{th}$ PRU, $l_p^m$ denotes the subcarrier index of the $p^{th}$ pilot tone in the $m^{th}$ PRU, $k_p^m$ denotes the time index of the $p^{th}$ pilot tone in the $m^{th}$ PRU, $X[l_p^m, k_p^m]$ denotes a symbol in which the $p^{th}$ pilot tone of the $m^{th}$ PRU is located, $Y[l_p^m, k_p^m]$ denotes a received signal at the $p^{th}$ pilot tone in the $m^{th}$ PRU, and μ denotes a pilot boosting value.

The pilot LS estimator 312 outputs the calculated $\hat{H}_{LS}[m][p]$ to the LS updater 314. The velocity and channel quality information estimated by the velocity and channel quality estimator 306 is also output to the LS updater 314. Then the LS updater 314 operates as follows to additionally increase channel estimation performance.

If pilot tones and data tones are allocated to contiguous PRUs to which the same precoding scheme is applied, the LS updater 314 detects the LS estimates of the most adjacent pilot tones in the contiguous PRUs and updates them. The operation of the LS updater 314 will be described with reference to FIG. 1.

The LS updater 314 updates the LS estimates of the most adjacent pilot tones, that is, the pilot tones 105 and 106 in the $m^{th}$ PRU 100 and the pilot tones 107 and 108 in the $(m+1)^{th}$ PRU 120 by equation 2.

$$\begin{bmatrix} \hat{H}_{LS,adjacentMMSE}[m][4] \\ \hat{H}_{LS,adjacentMMSE}[m][5] \\ \hat{H}_{LS,adjacentMMSE}[m+1][0] \\ \hat{H}_{LS,adjacentMMSE}[m+1][1] \end{bmatrix} = \quad (2)$$

$$R_{dp}\left(R_{pp} + \frac{1}{CINR_{estimated}}I\right)^{-1} \begin{bmatrix} \hat{H}_{LS}[m][4] \\ \hat{H}_{LS}[m][5] \\ \hat{H}_{LS}[m+1][0] \\ \hat{H}_{LS}[m+1][1] \end{bmatrix}$$

C where $\hat{H}_{LS,adjacentMMSE}[m][4]$ denotes the updated LS estimate of the fourth pilot tone 105 included in the $m^{th}$ PRU 100, $\hat{H}_{LS,adjacentMMSE}[m][5]$ denotes the updated LS estimate of the fifth pilot tone 106 included in the $m^{th}$ PRU 100, $\hat{H}_{LS,adjacentMMSE}[m+1][0]$ denotes the updated LS estimate of the $0^{th}$ pilot tone 107 included in the $(m+1)^{th}$ PRU 120, $\hat{H}_{LS,adjacentMMSE}[m+1][1]$ denotes the updated LS estimate of the first pilot tone 108 included in the $(m+1)^{th}$ PRU 120, $R_{dp}$ denotes the cross-correlation values between all data tones and each pilot tone in a PRU, $R_{pp}$ denotes the auto-correlation value of each pilot tone in the PRU, $CINR_{estimated}$ denotes an estimated CINR, $\hat{H}_{LS}[m][4]$ denotes the LS estimate of the fourth pilot tone 105 included in the $m^{th}$ PRU 100, $\hat{H}_{LS}[m][5]$ denotes the LS estimate of the fifth pilot tone 106 included in the $m^{th}$ PRU 100, $\hat{H}_{LS}[m+1][0]$ denotes the LS estimate of the $0^{th}$ pilot tone 107 included in the $(m+1)^{th}$ PRU 120, and $\hat{H}_{LS}[m+1][1]$ denotes the LS estimate of the first pilot tone 108 included in the $(m+1)^{th}$ PRU 120.

$R_{dp}$ and $R_{pp}$ are calculated by multiplying a time correlation by a frequency correlation. The estimated velocity is used for the time correlation and a channel delay spread is used for the frequency correlation.

The final channel estimator 316 receives the updated LS estimates calculated by equation 2 from the LS updater 314 and the estimated velocity and channel quality information from the velocity and channel quality estimator 306. Then, the final channel estimator 316 estimates the channel of each pilot tone in the $m^{th}$ and $(m+1)^{th}$ PRUs using the updated LS estimates, the non-updated LS estimates of the remaining pilot tones, and the estimated velocity and channel quality information. The final channel estimator 316 estimates a channel by $$\hat{H}_m[l,k] = R_{dp}\left(R_{pp} + \frac{1}{CINR_{estimated}}I\right)^{-1} \begin{bmatrix} \hat{H}_{LS}[m][0] \\ \hat{H}_{LS}[m][1] \\ \hat{H}_{LS}[m][2] \\ \hat{H}_{LS}[m][3] \\ \hat{H}_{LS,adjacentMMSE}[m][4] \\ \hat{H}_{LS,adjacentMMSE}[m][5] \end{bmatrix} \quad (3)$$

$$\hat{H}_{m+1}[l,k] = R_{dp}\left(R_{pp} + \frac{1}{CINR_{estimated}}I\right)^{-1} \begin{bmatrix} \hat{H}_{LS,adjacentMMSE}[m+1][0] \\ \hat{H}_{LS,adjacentMMSE}[m+1][1] \\ \hat{H}_{LS}[m+1][2] \\ \hat{H}_{LS}[m+1][3] \\ \hat{H}_{LS}[m+1][4] \\ \hat{H}_{LS}[m+1][5] \end{bmatrix}$$

where $\hat{H}_m[l,k]$ denotes the channel estimate of the $m^{th}$ PRU and $\hat{H}_{m+1}[l,k]$ denotes the channel estimate of the $(m+1)^{th}$ PRU.

The memory 310 stores information associated with operation of the mobile terminal. In particular, the memory 310 stores the estimated velocity and channel quality information received from the velocity and channel quality estimator 306. The memory 310 also stores estimated channel information received from the channel estimator 308, and the LS estimates of pilot tones received from the pilot LS estimator 312 and the updated LS estimates received from the LS updater 314.

Figure 4:
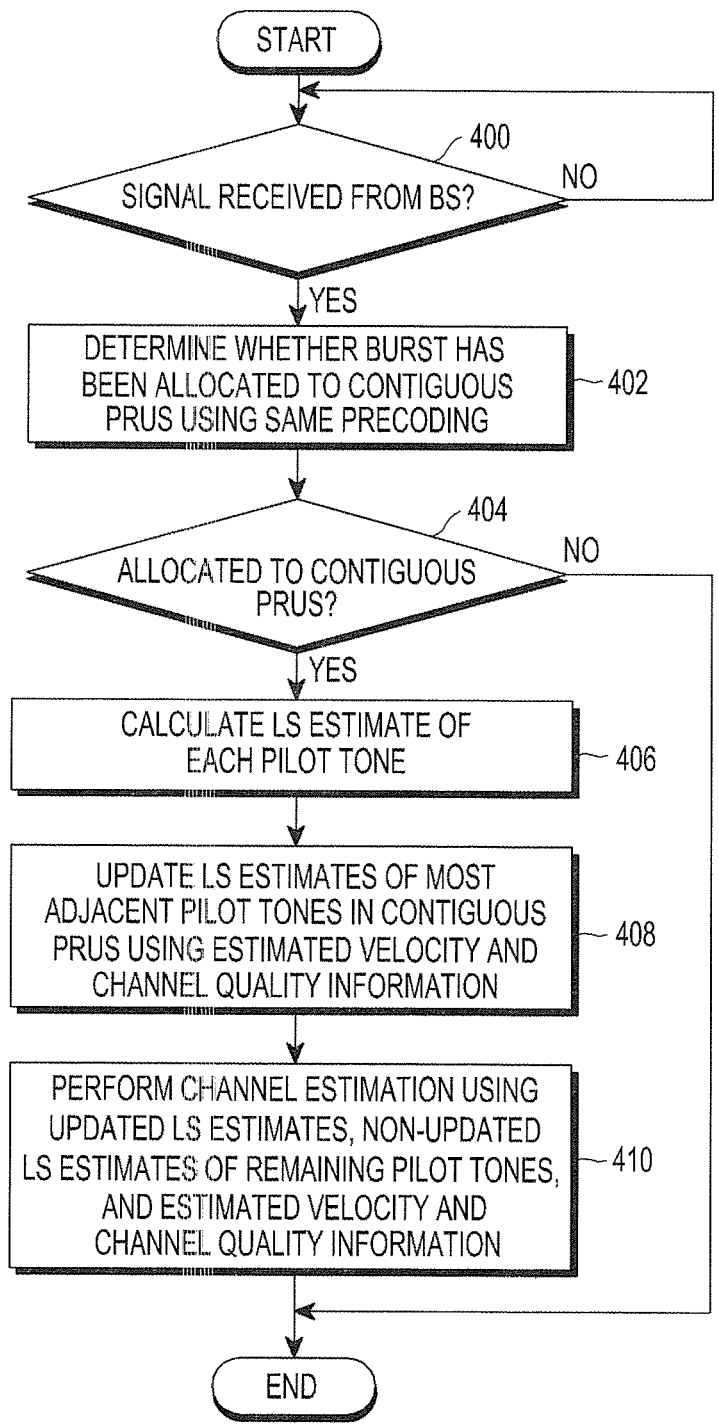
FIG. 4 illustrates an example operation of the mobile terminal according to an embodiment of the present invention.

FIG. 4 illustrates an example operation of the mobile terminal according to an embodiment of the present invention.

Referring to FIG. 4, upon receipt of a signal from a BS in step 400, the mobile terminal converts the received signal to a frequency signal using an FFT and generates a logical signal from the frequency signal. In step 402, the mobile terminal determines whether a burst has been allocated to contiguous PRUs to which the same precoding has been applied.

In step 04, if the burst has been allocated to contiguous PRUs to which the same precoding has been applied, the mobile terminal calculates an LS estimate of each pilot tone in step 406 and updates the LS estimates of the most adjacent pilot tones in the contiguous PRUs using estimated velocity and channel quality information in step 408.

Specifically, if the contiguous PRUs include an $m^{th}$ PRU and an $(m+1)^{th}$ PRU, the mobile terminal operates as follows. The mobile terminal detects the LS estimates of pilot tones having a smallest subcarrier spacing from the $(m+1)^{th}$ PRU from among the pilot tones of the $m^{th}$ PRU. The mobile terminal then updates the detected LS estimates using the estimated velocity and channel quality information. In addition, the mobile terminal detects the LS estimates of pilot tones having a smallest subcarrier spacing from the $m^{th}$ PRU from among the pilot tones of the $(m+1)^{th}$ PRU. Then, the mobile terminal updates the detected LS estimates using the estimated velocity and channel quality information.

Next, the mobile terminal performs channel estimation using the updated LS estimates, the non-updated LS estimates of the remaining pilot tones, and the estimated velocity and channel quality information in step 410.

As is apparent from the above description of the present invention, channel estimation performance can be increased using the most adjacent pilot tones included in contiguous PRUs to which the same precoding scheme is applied. In addition, the channel estimation performance can be increased in a simple manner.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for performing channel estimation by a receiver in a wireless communication system, comprising:
   calculating channel estimates of first pilot tones included in a first resource allocation block;
   calculating channel estimates of second pilot tones included in a second resource allocation block, the first resource allocation block and the second resource allocation block being, contiguous;
   detecting, from the first pilot tones, third pilot tones having a smallest subcarrier spacing from the second resource allocation block;
   detecting, from the second pilot tones, fourth pilot tones having a smallest subcarrier spacing from the first resource allocation block;
   updating channel estimates of the third and fourth pilot tones based on channel quality information; and
   performing channel estimation using the updated channel estimates.

2. The channel estimation method of claim 1, wherein the first and second resource allocation blocks are included in a same subband, and a same precoding scheme is used in the first and second resource allocation blocks.

3. The channel estimation method of claim 1, wherein each of the first and second resource allocation blocks includes a Physical Resource Unit (PRU).

4. The channel estimation method of claim 1, wherein the channel estimates of the first pilot tones comprise Least Square (LS) estimates of the first pilot tones, and the channel estimates of the second pilot tones comprise LS estimates of the second pilot tones.

5. The channel estimation method of claim 1, wherein the updating comprises updating the channel estimates of the third and fourth pilot tones based on the channel quality information, cross-correlation values between all data tones and each pilot tone in a related resource allocation block calculated using a velocity of the receiver, and an auto-correlation value of each pilot tone in the related resource allocation block.

6. The channel estimation method of claim 1, wherein the updating comprises updating the channel estimates of the third and fourth pilot tones based on velocity of the receiver and the channel quality information.

7. The channel estimation method of claim 1, wherein the channel quality information includes a Carrier-to-Interference and Noise Ratio (CINR) information.

8. The channel estimation method of claim 1, wherein the updating comprises updating Least Square (LS) estimates of the third and fourth pilot tones as the channel estimates of the third and fourth pilot tones according to the following equation, $$\begin{bmatrix} \hat{H}_{LS,adjacentMMSE}[m][4] \\ \hat{H}_{LS,adjacentMMSE}[m][5] \\ \hat{H}_{LS,adjacentMMSE}[m+1][0] \\ \hat{H}_{LS,adjacentMMSE}[m+1][1] \end{bmatrix} = R_{dp}\left(R_{pp} + \frac{1}{CINR_{estimated}}I\right)^{-1} \begin{bmatrix} \hat{H}_{LS}[m][4] \\ \hat{H}_{LS}[m][5] \\ \hat{H}_{LS}[m+1][0] \\ \hat{H}_{LS}[m+1][1] \end{bmatrix}$$

where $\hat{H}_{LS,adjacentMMSE}[m][4]$ denotes an updated LS estimate of a fourth pilot tone included in an $m^{th}$ resource allocation block being the first resource allocation block, $\hat{H}_{LS,adjacentMMSE}[m][5]$ denotes an updated LS estimate of a fifth pilot tone included in the $m^{th}$ resource allocation block, $\hat{H}_{LS,adjacentMMSE}[m+1][0]$ denotes an updated LS estimate of a $0^{th}$ pilot tone included in an $(m+1)^{th}$ resource allocation block being the second resource allocation block, $\hat{H}_{LS,adjacentMMSE}[m+1][1]$ denotes an updated LS estimate of a first pilot tone included in the $(m+1)^{th}$ resource allocation block, $R_{dp}$ denotes cross-correlation values between all data tones and each pilot tone in a related resource allocation block calculated using a velocity of the receiver, $R_{pp}$ denotes an auto-correlation value of each pilot tone in the related resource allocation block, $CINR_{estimated}$ denotes an estimated CINR as the channel quality information, $\hat{H}_{LS}[m][4]$ denotes an LS estimate of the fourth pilot tone included in the $m^{th}$ resource allocation block, $\hat{H}_{LS}[m][5]$ denotes an LS estimate of the fifth pilot tone included in the $m^{th}$ resource allocation block, $\hat{H}_{LS}[m+1][0]$ denotes an LS estimate of the $0^{th}$ pilot tone included in the $(m+1)^{th}$ resource allocation block, and $\hat{H}_{LS}[m+1][1]$ denotes an LS estimate of the first pilot tone included in the $(m+1)^{th}$ resource allocation block.

9. The channel estimation method of claim 8, wherein the performing channel estimation comprises performing channel estimation according to the following equation, $$\hat{H}_m[l,k] = R_{dp}\left(R_{pp} + \frac{1}{CINR_{estimated}}I\right)^{-1} \begin{bmatrix} \hat{H}_{LS}[m][0] \\ \hat{H}_{LS}[m][1] \\ \hat{H}_{LS}[m][2] \\ \hat{H}_{LS}[m][3] \\ \hat{H}_{LS,adjacentMMSE}[m][4] \\ \hat{H}_{LS,adjacentMMSE}[m][5] \end{bmatrix}$$

$$\hat{H}_{m+1}[l,k] = R_{dp}\left(R_{pp} + \frac{1}{CINR_{estimated}}I\right)^{-1} \begin{bmatrix} \hat{H}_{LS,adjacentMMSE}[m+1][0] \\ \hat{H}_{LS,adjacentMMSE}[m+1][1] \\ \hat{H}_{LS}[m+1][2] \\ \hat{H}_{LS}[m+1][3] \\ \hat{H}_{LS}[m+1][4] \\ \hat{H}_{LS}[m+1][5] \end{bmatrix}$$

where $\hat{H}_m[l,k]$ denotes a channel estimate of the $m^{th}$ resource allocation block, $\hat{H}_{m+1}[l,k]$ denotes a channel estimate of the $(m+1)^{th}$ resource allocation block, l denotes a subcarrier index, and k denotes a time index.

10. The channel estimation method of claim 1, wherein the performing channel estimation comprises performing channel estimation using the updated channel estimates of the third and fourth pilot tones, non-updated channel estimates of remaining pilot tones, velocity of the receiver, and the channel quality information.

11. An apparatus in a wireless communication system, comprising:
a receiver configured to receive a signal from a transmitter; and
a channel estimator configured to:
calculate channel estimates of first pilot tones included in a first resource allocation block;
calculate channel estimates of second pilot tones included in a second resource allocation block;
detect, from the first pilot tones, third pilot tones having a smallest subcarrier spacing from the second resource allocation block;
detect, from the second pilot tones, channel estimates of fourth pilot tones having a smallest subcarrier spacing from the first resource allocation block;
update channel estimates of the third and fourth pilot tones based on channel quality information; and
perform channel estimation using the updated channel estimates.

12. The apparatus of claim 11, wherein the first and second resource allocation blocks are included in a same subband, and a same precoding scheme is used in the first and second resource allocation blocks.

13. The apparatus of claim 11, wherein each of the first and second resource allocation blocks includes a Physical Resource Unit (PRU).

14. The apparatus of claim 11, wherein the channel estimates of the first pilot tones comprise Least Square (LS) estimates of the first pilot tones, and the channel estimates of the second pilot tones comprise LS estimates of the second pilot tones.

15. The apparatus of claim 11, wherein the channel estimator is configured to update the channel estimates of the third and fourth pilot tones based on the channel quality information, cross-correlation values between all data tones and each pilot tone in a related resource allocation block calculated using a velocity of the apparatus, and an auto-correlation value of each pilot tone in the related resource allocation block.

16. The apparatus of claim 11, further comprising a velocity and channel quality information estimator configured to estimate velocity of the apparatus and channel quality information;
wherein the channel estimator is configured to update the channel estimates of the third and fourth pilot tones based on the velocity and the channel quality information.

17. The apparatus of claim 11, wherein the channel quality information includes a Carrier-to-Interference and Noise Ratio (CINR) information.

18. The apparatus of claim 11, wherein the channel estimator is configured to update Least Square (LS) estimates of the third and fourth pilot tones as the channel estimates of the third and fourth pilot tones according to the following equation, $$\begin{bmatrix} \hat{H}_{LS,adjacentMMSE}[m][4] \\ \hat{H}_{LS,adjacentMMSE}[m][5] \\ \hat{H}_{LS,adjacentMMSE}[m+1][0] \\ \hat{H}_{LS,adjacentMMSE}[m+1][1] \end{bmatrix} =$$

$$R_{dp}\left(R_{pp} + \frac{1}{CINR_{estimated}}I\right)^{-1} \begin{bmatrix} \hat{H}_{LS}[m][4] \\ \hat{H}_{LS}[m][5] \\ \hat{H}_{LS}[m+1][0] \\ \hat{H}_{LS}[m+1][1] \end{bmatrix}$$

where $\hat{H}_{LS,adjacentMMSE}[m][4]$ denotes an updated LS estimate of a fourth pilot tone included in an $m^{th}$ resource allocation block being the first resource allocation block, $\hat{H}_{LS,adjacentMMSE}[m][5]$ denotes an updated LS estimate of a fifth pilot tone included in the $M^{th}$ resource allocation block, $\hat{H}_{LS,adjacentMMSE}[m+1][0]$ denotes an updated LS estimate of a $0^{th}$ pilot tone included in an $(m+1)^{th}$ resource allocation block being the second resource allocation block, $\hat{H}_{LS,adjacentMMSE}[m+1][1]$ denotes an updated LS estimate of a first pilot tone included in the $(m+1)^{th}$ resource allocation block, $R_{dp}$ denotes cross-correlation values between all data tones and each pilot tone in a related resource allocation block calculated using a velocity of the apparatus, $R_{pp}$ denotes an auto-correlation value of each pilot tone in the related source allocation block, $CINR_{estimated}$ denotes an estimated CINR as the channel quality information, $\hat{H}_{LS}[m][4]$ denotes an LS estimate of the fourth pilot tone included in the $m^{th}$ resource allocation block, $\hat{H}_{LS}[m][5]$ denotes an LS estimate of the fifth pilot tone included in the $m^{th}$ resource allocation block, $\hat{H}_{LS}[m+1][0]$ denotes an LS estimate of the $0^{th}$ pilot tone included in the $(m+1)^{th}$ resource allocation block, and $\hat{H}_{LS}[m+1][0]$ denotes an LS estimate of the first pilot tone included in the $(m+1)^{th}$ resource allocation block.

19. The apparatus of claim 18, wherein the channel estimator is configured to perform channel estimation according to the following equation, $$\hat{H}_m[l,k] = R_{dp}\left(R_{pp} + \frac{1}{CINR_{estimated}}I\right)^{-1} \begin{bmatrix} \hat{H}_{LS}[m][0] \\ \hat{H}_{LS}[m][1] \\ \hat{H}_{LS}[m][2] \\ \hat{H}_{LS}[m][3] \\ \hat{H}_{LS,adjacentMMSE}[m][4] \\ \hat{H}_{LS,adjacentMMSE}[m][5] \end{bmatrix}$$

$$\hat{H}_{m+1}[l,k] = R_{dp}\left(R_{pp} + \frac{1}{CINR_{estimated}}I\right)^{-1} \begin{bmatrix} \hat{H}_{LS,adjacentMMSE}[m+1][0] \\ \hat{H}_{LS,adjacentMMSE}[m+1][1] \\ \hat{H}_{LS}[m+1][2] \\ \hat{H}_{LS}[m+1][3] \\ \hat{H}_{LS}[m+1][4] \\ \hat{H}_{LS}[m+1][5] \end{bmatrix}$$

where $\hat{H}_m[l,k]$ denotes a channel estimate of the $m^{th}$ resource allocation block, $\hat{H}_{m+1}[l,k]$ denotes a channel estimate of the $(m+1)^{th}$ resource allocation block, l denotes a subcarrier index, and k denotes a time index.

20. The apparatus of claim 11, wherein the channel estimator is configured to perform channel estimation using the updated channel estimates of the third and fourth pilot tones, non-updated channel estimates of remaining pilot tones, velocity of the apparatus, and channel quality information.

* * * * *